United States Patent [19]

Inoue

[11] 4,422,918
[45] Dec. 27, 1983

[54] CURRENT-CONDUCTING ASSEMBLY FOR A TRAVELING WIRE-ELECTRODE

[75] Inventor: Kiyoshi Inoue, Tokyo, Japan

[73] Assignee: Inoue-Japax Research Incorporated, Yokohama, Japan

[21] Appl. No.: 234,578

[22] Filed: Feb. 13, 1981

Related U.S. Application Data

[63] Continuation-in-part of Ser. No. 115,390, Jan. 25, 1980, Pat. No. 4,263,116.

[30] Foreign Application Priority Data

Feb. 14, 1980 [JP]  Japan ............................ 55-16512[U]

[51] Int. Cl.³ .................... C25D 17/00; B23P 1/04; B23P 1/12; H01R 39/28
[52] U.S. Cl. ........................... 204/206; 204/224 M; 204/225; 204/279; 219/69 W; 310/231; 310/249; 310/251; 310/253; 339/5 R
[58] Field of Search ....... 219/69 W; 204/206, 224 M, 204/279, 225; 339/6 R, 5 R, , 5 A, 5 M, 5 P, 5 S, 6 R, 6 A, 8 R, 8 A; 310/248-249, 251-253

[56] References Cited

U.S. PATENT DOCUMENTS

| | | | |
|---|---|---|---|
| 2,392,687 | 1/1946 | Nachtman | 204/206 |
| 2,725,354 | 11/1955 | Murray | 204/206 X |
| 2,780,743 | 2/1957 | Elsey | 310/251 X |
| 3,005,078 | 10/1961 | Mottu et al. | 339/5 R X |
| 3,358,166 | 12/1967 | Nolan | 310/252 X |
| 3,579,430 | 5/1971 | Lawler | 204/206 |
| 3,720,596 | 3/1973 | Kohler | 204/206 |
| 3,870,618 | 3/1975 | Seyb, Jr. et al. | 204/206 X |
| 3,989,923 | 11/1976 | Lees et al. | 339/5 RL |
| 4,000,430 | 12/1976 | Bely et al. | 310/251 |
| 4,233,486 | 12/1980 | Inoue | 219/69 W |
| 4,347,456 | 8/1982 | Chabrerie | 310/219 X |

FOREIGN PATENT DOCUMENTS

| | | | |
|---|---|---|---|
| 2856231 | 7/1979 | Fed. Rep. of Germany | 219/69 W |
| 488677 | 1/1976 | U.S.S.R. | 219/69 W |

*Primary Examiner*—Donald R. Valentine
*Attorney, Agent, or Firm*—Karl F. Ross; Herbert Dubno

[57] ABSTRACT

A current-conductor assembly for conducting a machining current to a wire electrode in a wire-cutting electroerosion machine comprises a pair of coplanar wheels rotatable about their respective shafts and having their respective peripheries for receiving the wire electrode between them. The wheels are urged towards one another to press the wire electrode between the peripheries and a brush connectable electrically to a source of the machining current and adapted to be urged under pressure into electrical contact with a flank of one of the wheels which is electrically conductive for conducting the current to the wire electrode. The brush is an electrically conductive body preferably composed of copper, graphite or a copper/graphits composite material containing a solid-state lubricating material, e.g. $MoS_2$ or $WS_2$. The pressing wheel urged towards the conducting wheel is, at least along its peripheral region, composed of an elastomeric material.

17 Claims, 5 Drawing Figures

CURRENT-CONDUCTING ASSEMBLY FOR A TRAVELING WIRE-ELECTRODE

CROSS-REFERENCE TO RELATED APPLICATION

This application is a continuation in part of U.S. application Ser. No. 115,390 filed Jan. 25, 1980, now U.S. Pat. No. 4,263,116.

FIELD OF THE INVENTION

The present invention relates to a current-conducting assembly for conducting a machining currrent to an axially traveling wire-electrode in a wire-cutting electroerosion machine.

BACKGROUND OF THE INVENTION

A wire-cutting electroerosion machine makes use of a continuous wire electrode composed of a metal such as copper or tungsten or an alloy such as brass and having a thickness generally ranging between 0.05 and 0.5 mm $\phi$. The wire electrode is axially displaced by a drive means and thereby advanced and transported from a supply side to a collection or takeup side through a cutting zone in the region of a workpiece at a rate of axial displacement of, say 1 to 2 m/min. For defining the cutting zone a pair of guide members may be arranged to provide a straight line path along which the wire electrode is passed and juxtaposed in a machining relationship with the workpiece across a minute machining gap. A machining liquid, e.g. a liquid dielectric such as distilled water or a liquid electrolyte, is supplied to fill and flush the machining gap while an electric current is applied between the wire electrode and the workpiece to produce a succession of electrical discharges and/or an intense electrolytic action through the fluid medium, thereby permitting material to be electroerosively removed from the workpiece. As material removal proceeds, the workpiece is displaced relative to the axially traveling electrode and generally transverse to the axis thereof along a prescribed path to form a desired cut in the workpiece.

In the path of wire travel, the drive means is typically constituted by drive rollers driven by a motor and provided immediately upstream of the collection or takeup side to apply a traction force to the wire. Brake rollers driven by a motor may further be provided immediately downstream of the supply side to assure that the wire travels stretched under a suitable tension and at a desired rate of advance along the path and through the cutting zone defined between the machining guide members. Additionally and depending on the locations of the wire supply and collection sites, further wire guides may be provided in the path of the traveling wire to change the direction of wire travel from the supply side to the cutting zone and from the latter to the collection side, respectively.

Heretofore, various forms of each of the machining guide members have been in use. One makes use of a die or an internal passage formed through an elongated solid member. This structure is, however, inconvenient for mounting and dismounting the continuous wire. In another form, a V-shaped notch formed on a fixed guide body provides a bearing surface for the traveling wire but this tends to cause the traveling wire to come off, thereby giving rise to machining inaccuracy.

Means for conducting the machining current to the traveling wire-electrode has hitherto been available basically in two forms.

In a first form, an electrically conductive block with a terminal element leading via a cable to a source of the machining current has a pin or projection formed with a recess located in the path of wire travel. The block is securely mounted on a portion of the electroerosion machine and the wire electrode is guided to pass through the recess of the pin in a frictional contact therewith. Due to the minor interfacial surface irregularities, the moving wire tends to be scratched on the open guide recess and consequently tends to be locally floated, tumbled or jumped, causing the wire to be irregularly vibrated due to the resulting tension fluctuation. As a result, an undesirable wavy formation or longitudinal scar tends to develop on the machined workpiece surface, a cause of deterioration of the surface finish and machining accuracy. Further, undesirable electrical discharges are created between the surface of the tumbling wire and the pin recess, leaving discharge flaws on the guide surface which facilitate the scratching and the development of abnormal discharges and may also result in breakage of the wire electrode.

In a second form, a conducting wheel is rotatably supported via ball bearings on a conducting block having a terminal element leading via a cable to a source of the machining current and has a peripheral recess located in the path of wire travel. The block is here again securely mounted on a portion of the electroerosion machine and the wire electrode is guided to pass through the recess. In this arrangement, the undesirable development of abnormal electrical discharges at the ballbearing portions between the conducting block and the wheel is further added, tending to damage the ball bearings and hence to arrest smooth rotation of the conducting wheel and to limit the life of the conductor assembly.

OBJECT OF THE INVENTION

It is accordingly an important object of the present invention to provide a current-conducting assembly for conducting machining current to a wire electrode driven in a wire-cutting electroerosion machine, which assures smooth passage of the wire electrode, which eliminates the development of an undesirable electrical discharge along the guiding surface for the driven wire electrode and which provides prolonged service life.

SUMMARY OF THE INVENTION

In accordance with the present invention, there is provided a current-conducting assembly for conducting a machining current to a wire electrode axially displaced by drive means and thereby continuously transported from a supply side to a collection side through the region of a workpiece in an electroerosion machine, which assembly comprises a pair of co-planar wheels rotatable about their respective shafts extending in parallel with one another and having their respective peripheries receiving the wire electrode therebetween; means for urging the wheels towards one another to press the wire electrode between the said peripheries; and brush means connectable electrically to a source of the machining current and adapted to be in electrical contact with a flank of one of the coplanar wheels which is electrically conductive for conducting the machining current to the wire electrode.

Preferably, the pressing wheel or one of the wheels which is urged towards the other has its periphery made of an elastomeric material. The brush means is preferably formed of a body of copper, graphite or a mixture thereof containing a solid-state lubricating material finely divided and uniformly distributed at least along the surface of the body for contact with the flank of the said one wheel. The solid-state lubricating material is preferably composed of molybdenum disulfide or tungsten disulfide.

BRIEF DESCRIPTION OF DRAWING

These and other objects, features and advantages of the present invention will become more readily apparent from the following description of certain embodiments thereof as taken with reference to the accompanying drawing in which.

SPECIFIC DESCRIPTION

Figure 1:
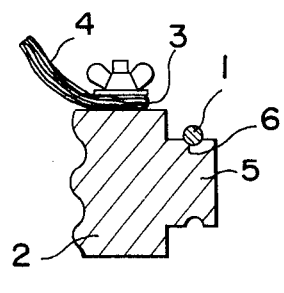
FIG. 1 is a sectional plan view of a conventional pin assembly for conducting a machining current to a moving wire-electrode.

In FIG. 1, there is shown a conventional pin assembly for conducting a machining current to a moving wire-electrode 1. The assembly comprises an electrically conductive block 2 with a terminal element 3 leading via a cable 4 to a source of machining current (not shown). The block 2 has a pin or projection 5 formed with a recess 6 located in the path of wire travel. The block 2 is securely mounted on a portion of the electroerosion machine (not shown) and the wire electrode 1 is guided to pass through the recess 6 in frictional contact therewith. In this assembly, due to the minor interfacial surface irregularities, the moving wire 1 tends to be scratched on the open guide recess and consequently tends to be locally floated, tumbled or jumped, causing the wire 1 to be, due to the resulting tension changes, irregularly vibrated. As a result, an undesirable wavy formation or longitudinal scar tnds to be developed on the surface of the workpiece (not shown) machined, thus deteriorating the machining accuracy and finishing quality. Further, undesirable electrical discharges develop between the surface of the tumbling wire 1 and the pin recess 6 and this leaves discharge flaws due to the abnormal discharges and may also result in breakage of the wire electrode 1.

Figure 2:
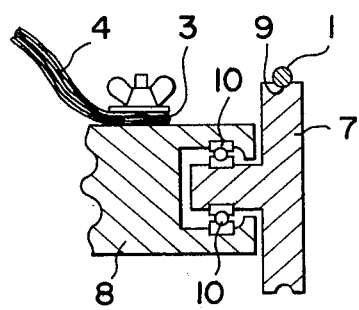
FIG. 2 is a sectional plan view of a conventional wheel assembly for conducting a machining current to a wire electrode.

In another form of the conventional wire-conductor assembly shown in FIG. 2, a conducting wheel 7 is rotatably held via ball bearings 10 on a conductive support member 8 having the terminal 3 and has a peripheral recess 9 located in the path of wire travel. The support member 8 is securely mounted on a portion of the machine and the wire electrode 1 is guided through the recess 9. In this arrangement, the problem of undesirable development of abnormal electrical discharges at the ball-bearing portions 10 between the conductive support member 8 and the conductive wheel 7 is further added, tending to damage the ball bearings 10 and hence to prevent a smooth rotation of the wheel 7 and to limit the life of the conductor assembly.

Figure 3:
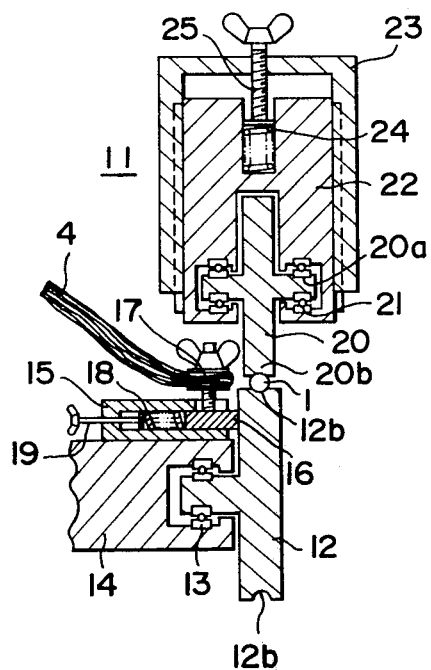
FIG. 3 is a sectional plan view illustrating a current conducting assembly for a wire electrode according to the present invention.

An assembly 11 embodying the present invention shown in FIG. 3 comprises a first wheel 12 which is electrically conductive and has its shaft 12a rotatably supported via ball bearings 13 on a support member 14 securely mounted on a portion of the electroerosion machine (not shown). The support member 14 may not be electrically conductive and has a casing 15 securely attached thereto. The casing 15 is provided for retaining a brush body 16 slidably therein which is electrically conductive and advantageously is composed of copper, graphite or a copper-graphite composite material, preferably containing a solid-state lubricating material such as tungsten disulfide or molybdenum disulfide finely divided and uniformly distributed therein. The brush body 16 has a terminal element 17 secured thereto which leads via a cable 4 to a source of machining current (not shown) and is urged toward one flank of the wheel 12 by means of a spring 18 received in the hollow casing 15. A screw 19 is threaded into the hollow casing 15 and is held at a desired position to adjust the position of the brush body 16 therein and hence the urging pressure of the body 16 against the wheel 12. This urging means may be substituted by any other known arrangement, e.g. a piston-cylinder arrangement operated by a pressurized fluid.

When the support member 14 is electrically conductive, the casing 15 should be composed of electrically insulating material or a suitable insulation should be provided between the casing 15 when electrically conductive and the conducting brush body 16. The solid-state lubricating material when contained in the brush body 16 should be distributed at least along the surface of the body 16 coming in contact with the wheel 12. The wheel 12 may generally be composed of copper.

A second wheel 20 has its shaft 20a extending in parallel with the shaft 12a of the first wheel 12 and is arranged to be coplanar with the first wheel 12. The shaft 20a is rotatably mounted via ball bearings 21 on a support member 22 which is slidably received in a hollow casing 23 and is displaceable in the direction of the said portion of the electroerosion machine.

Means for urging the second wheel 20 towards the first wheel 12 comprises a spring 24 received in the hollow casing 23 and in contact with the movable support member 22. A screw 25 is threaded into the hollow casing 23 and held at a desired position to adjust the urging pressure of the second wheel 20 towards the first wheel 12. This means may be substituted by any other known arrangement, e.g. a piston-cylinder arrangement operated by a pressurized fluid.

The wire electrode 1 is positioned between the peripheries 12b and 20b of the first and second wheels 12 and 20. The screw 25 is driven to urge the support member 22 and hence the second wheel 20 towards the first wheel 12 to press the wire electrode 1 between the opposed peripheries 20b and 12b under spring force exerted by the spring 24. An appropriate urging pressure is established by the position of the screw 25 driven into the hollow casing 23 and, when the wire electrode 1 is axially displaced by drive means (not shown), causes the wheels 12 and 20 to be rotated without slipping. The brush body 16 is urged against the rotating wheel 12 under spring force exerted by the spring 18 to conduct the machining current to the wire electrode 1. An appropriate contact pressure is established by the position of the screw 19 driven into the hollow casing 15. Since there is no slipping between the moving wire-electrode 1 and the conducting wheel 12 driven into rotation thereby and the moving wire-electrode 1 as it passes over the conducting wheel 12 is firmly held in contact therewith by the pressing wheel 20, there occurs no undesirable tumbling of the wire electrode 1 and no damaging electrical discharge between the contacting surfaces as with the conventional assemblies. The wire electrode 1 is allowed to pass smoothly without causing vibrations which deteriorate the machining accuracy and surface finish. Further, by virtue of the fact that the machining current is conducted directly to the wheel 12 without intermediary of the bearing parts, a prolonged service life of the conducting wheel 12 and hence the assembly is obtained. It has further been found that the use of a brush body 16 containing a solid-state lubricating material assures an improved transmission of the machining current to the wire electrode 1.

Preferably, the periphery 12*b* of the conducting and pressed wheel 12 is recessed as shown to facilitate the retention of the wire electrode 1. In this case, the periphery 20*b* of the pressing wheel 20 may also be recessed as will be appreciate from FIG. 4.

Figure 4:
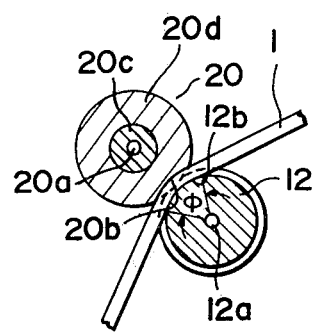
FIG. 4 is a sectional elevational view illustrating an arrangement of a pair of coplanar wheels guiding the driven wire electrode in accordance with the present invention.

It has also be found to be desirable that the pressing wheel 20 at least along its peripheral portion be composed of an elastomeric material. FIG. 4 therefore shows a modified pressing wheel 20 comprising an inner wheel portion 20*c* which is rigid and an outer wheel portion 20*d* composed of an elastomeric material such as natural or synthetic rubber. When the wire electrode 1 wraps around over the conducting wheel 12 with an angle φ as shown, the outer wheel portion 20*d* of the pressing wheel 20 is deformed so that the moving wire 1 along a portion of the length thereof wrapped over the conducting wheel 12 may be firmly held against the conducting wheel 12 to insure an improved current conduction between them.

In further modifications of the assembly according to the present invention, a brush 16 may be provided for the pressing wheel 20 as well so that the machining current may be conducted to the wire electrode 1 both from the pressing wheel 20 and the pressed wheel 12. In this case, the pressing wheel 20 or the outer wheel portion 20*d* may be composed of an electrically conductive elastomeric material, e.g. a rubber material having electrically conductive particles (e.g. copper or graphite) distributed therein in an amount sufficient to impart thereto adequate electrical conductivity. Generally, the homogeneous wheel 20 and the inner wheel portion 20*c* of the divided wheel 20 when serving as the additional conductor may be composed of copper.

In a still further modification, one of the wheels 12 and 20, preferably the conducting wheel 12, may be formed with a peripheral recess (12*b*, 20*b*), e.g. in the form of a V-shaped notch and the other may be formed with a plane or flat periphery or flange (20*b* as shown in FIG. 3). The recess, i.e. a recess annular or formed along the periphery of the one wheel should be of a uniform depth and adapted to receive and retain the wire electrode 1 therein and, when the retention depth of the recess is less than the diameter of the wire electrode 1, the other wheel may be of a width greater than the width of the recess. When the retention depth of the recess is greater than the wire 1 diameter, the other wheel should be of a width less than the width of the recess or, alternatively, may be formed with a flange of a profile substantially complementary to that of the said recess and adapted to be driven into a mating engagement therewith.

Figure 5:
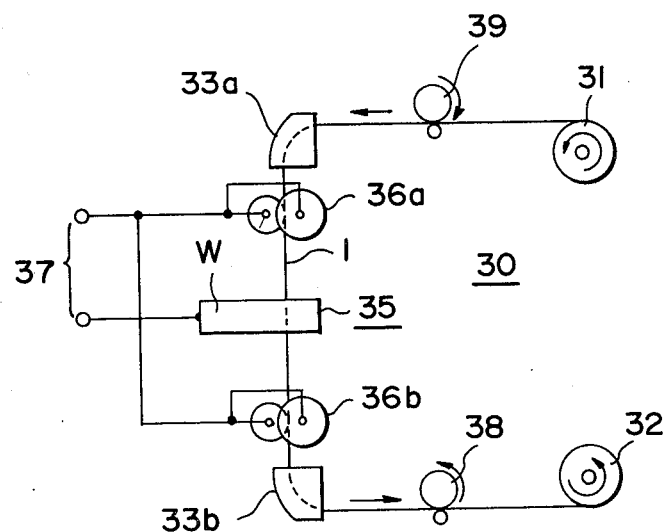
FIG. 5 is an elevation view essentially in section diagrammatically illustrating a wire-cutting electroerosion machine arrangement embodying the present invention.

FIG. 5 shows a wire-cutting electroerosive machining arrangement 30 with current-conducting assemblies which embody the present invention. In the arrangement, as in the conventional practice, a continuous wire electrode 1 is shown advanced axially and transported from a supply side 31 shown in the form of a supply drum to a collection side 32 shown in the form of a takeup drum. In the path of wire electrode 1 there is provided a pair of fixed guide members 33*a* and 33*b* designed to change the direction of wire travel from the supply side 31 to a machining zone 35 and from the latter to the takeup side 32. In the machining zone 5 there is juxtaposed a workpiece W with the traveling wire electrode 1 to form a machining gap therebetween. A machining fluid, e.g. distilled water or other liquid of dielectric nature (i.e. EDM fluid) or liquid electrolyte of a suitable conductivity (i.e. ECM fluid), is introduced into the machining zone 35.

Across the machining zone and between the fixed guide members 33*a*, 33*b*, there are provided wire-electrode guidance and holder members 36*a* and 36*b* for positioning the traveling wire-electrode 1 in a machining position with respect to the workpiece W across the machining zone 35. Each of the guide members 36*a* and 36*b* is here advantageously constituted as a conductor assembly according to the present invention. An electrical machining power supply 37 thus has its one output terminal connected to each of these members 36*a* and 36*b* and its other terminal connected to the workpiece W to conduct the machining current between the latter and the wire electrode through the machining gap. The material removal from the workpiece W takes place by EDM or ECM action depending upon the nature of machining liquid and the nature of machining current applied.

As machining proceeds, the workpiece W is carried by a table (not shown) and displaced relative to the traveling wire-electrode 1 along a prescribed path so that a desired machining cut corresponding to the displacement path is produced in the workpiece.

Shown also in the travel path are drive rollers 38 driven by a motor (not shown) and provided immediately upstream of the takeup side 32 to produce continuous or successive advancement and transportation of the wire electrode 1 and brake rollers 39 driven by a motor (not shown) and provided immediately downstream of the supply side 31. The drive rollers 38 and brake rollers 39 provide a predetermined rate of travel and a predetermined tension applied to the wire electrode 1.

There is thus provided, in accordance with the present invention, an improved current-conducting assembly for conducting a machining current to a traveling wire-electrode in a wire-cutting electroerosion machine.

What is claimed is:

1. A current-conducting assembly for conducting a machining current to a wire electrode axially displaced by drive means and thereby continuously transported from a supply side to a collection side through the region of a workpiece in an electroerosion machine, the assembly comprising:

a pair of freely rotatable coplanar wheels having their respective shafts extending in parallel with each other, at least one of said wheels being grooved along its periphery for retaining said wire electrode in said groove;

reboundable pressure means coupled with one of said shafts for urging said shafts towards one another while substantially maintaining the parallelism thereof to press said wire electrode between said wheels to allow said wheels to rotate with said wire electrode traveling axially; and brush means connectable electrically to a source of said machining current and adapted to be in electrical contact with a flank of at least one of said wheels which is electrically conductive for conducting the current to said wire electrode.

2. The assembly defined in claim 1, further comprising second reboundable pressure means to urging said brush means against said at least one wheel.

3. The assembly defined in claim 2 wherein said brush means is an electrically conductive body composed of a substance selected from the group consisting of copper, graphite and a copper/graphite composite material.

4. The assembly defined in claim 3 wherein said body contains a solid-state lubricating material finely divided and distributed at least along a region of the surface thereof for contact with said one wheel.

5. The assembly defined in claim 4 wherein said material is a substance selected from the group consisting of molybdenum disulfide and tungsten disulfide.

6. The assembly defined in claim 1 wherein said groove has a depth less than the diameter of said wire electrode and the other wheel which is not grooved has a plane periphery for pressing said wire electrode against the walls of said groove.

7. The assembly defined in claim 1 wherein said groove has a depth less than the diameter of said wire electrode and the other wheel which is not grooved is formed with a flange of a profile substantially complementary to that of said groove.

8. The assembly defined in claim 1, further comprising first and second support members for supporting said shafts, respectively, to hold said wheels rotatable about their respective axes, one of said support members being movable and adapted to be driven by said pressure means to drive the shaft supported thereby toward the other shaft.

9. The assembly defined in claim 8 wherein said groove is a V-shaped notch.

10. The assembly defined in claim 8 wherein said pressure means is spring means.

11. The assembly defined in claim 8 wherein said shafts are fixed to the respective wheels and are rotatably supported by said first and second support members via respective bearing means.

12. The assembly defined in claim 11 wherein said movable support members include a block slidably received in a hollow casing having spring means, constituting said pressure means, held in engagement with at least one of said block and said casing, further comprising pressure-adjusting means for compressing said spring means to establish a preselected urging pressure between said wheels.

13. The assembly defined in claim 12 wherein said pressure adjusting means comprises a bolt threaded through said hollow casing into engagement with said spring means.

14. The assembly defined in claim 8 wherein the electrically conductive wheel contacted by said brush means is stationary in its axial position and the wheel not contacted by said brush means is carried by the shaft driven by said movable support member and is, at least along its peripheral region, composed of an elastomeric material.

15. The assembly defined in claim 1 wherein said brush means is formed of an electrically conductive body having a finely divided solid-state lubricating material distributed at least along a surface region thereof for contact with said at least one wheel.

16. The assembly defined in claim 1 and arranged in said electroerosion machine so as to constitute, with said coplanar wheels, each of a pair of wire-guide members (36a, 36b) disposed across said region of the workpiece (35) and between a pair of wire-direction changing guide members (33a, 33b).

17. An assembly for conducting a machining current to a wire electrode axially displaced by drive means and thereby continuously transported from a supply side to a collection side through the region of a workpiece, the assembly comprising:

a pair of coplanar wheels rotatable about their respective axes and having their respective peripheries positioned for receiving said wire electrode therebetween;

means for urging said wheels towards one another to press said wire electrode between said peripheries; and brush means connectable electrically to a source of said machining current and adapted to be in electrical contact with a flank of one of said wheels which is electrically conductive for conducting the current to said wire electrode, the other wheel not contacted by said brush means being, at least along its peripheral region, composed of an elastomeric material.

* * * * *